United States Patent [19]

Nakajima

[11] Patent Number: 4,750,044
[45] Date of Patent: Jun. 7, 1988

[54] IMAGE EDITOR
[75] Inventor: Akio Nakajima, Toyokawa, Japan
[73] Assignee: Minolta Camera Kabushiki Kaisha, Osaka, Japan
[21] Appl. No.: 11,338
[22] Filed: Feb. 5, 1987
[30] Foreign Application Priority Data
  Feb. 5, 1986 [JP] Japan .................. 61-24836
[51] Int. Cl.⁴ .............................. H04N 1/40
[52] U.S. Cl. .................... 358/280; 358/283; 358/294
[58] Field of Search ............ 358/280, 283, 294
[56] References Cited

U.S. PATENT DOCUMENTS 4,193,096  3/1980  Stoffel .................. 358/260
4,194,221  3/1980  Stoffel .................. 358/283
4,517,606  5/1985  Yokomizo ............ 358/280
4,667,248  5/1987  Kanno ................. 358/280
4,675,736  6/1987  Lehmer ............... 358/183

FOREIGN PATENT DOCUMENTS 125060  7/1985  Japan .
126068  7/1985  Japan .

Primary Examiner—Howard W. Britton
Attorney, Agent, or Firm—Price, Gess & Ubell

[57] ABSTRACT

An image editor for editing image data of a document according to an attribute designated. The image editor includes attribute memory means for storing individual attributes for indicating a processing method of an image signal for every unit of a virtual area on an image area of a document, said virtual area being defined as one of the areas obtained by dividing the image area of a document regularly so as to have a larger area than that of one pixel and, attribute designation means for indicating an attribute of every unit of virtual area to said attribute memory means.

6 Claims, 4 Drawing Sheets

Fig. 1
| 31 21 19 29 | 33 43 45 35 |
| 23  7  5 17 | 41 57 59 47 |
|  9  1  3 15 | 55 63 61 49 |
| 25 11 13 27 | 39 53 51 37 |
| 34 44 46 36 | 32 22 20 30 |
| 42 58 60 48 | 24  8  6 18 |
| 56 64 62 50 | 10  2  4 16 |
| 40 54 52 38 | 26 12 14 28 |
Fig. 2
| 14  7  5 12 |
|  9  1  3 15 |
|  6 11 13  8 |
|  4 16 10  2 |
Fig. 3
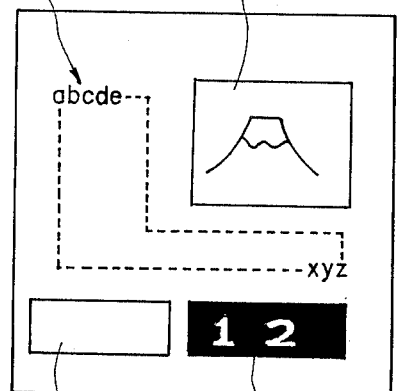
D (characters)   A (photograph)
C (void)   B (reversal)
Fig. 4
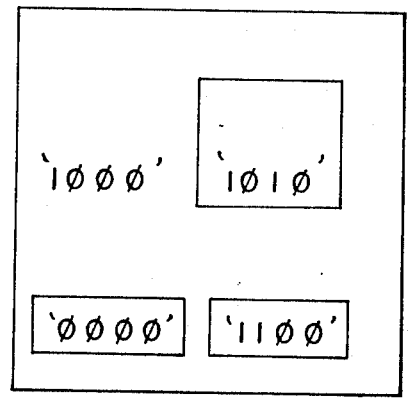
Fig. 5
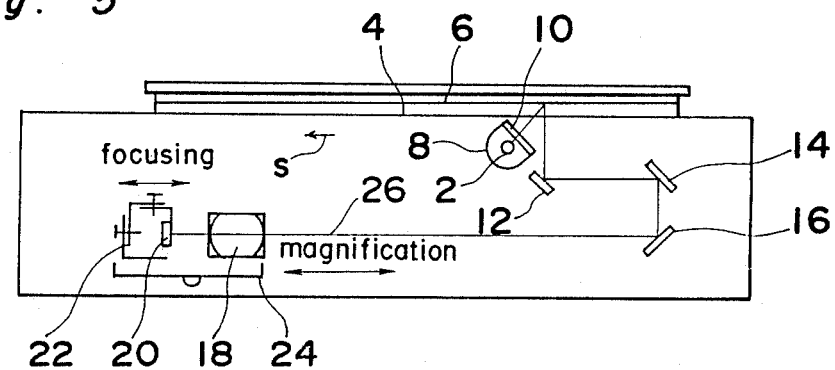

IMAGE EDITOR

BACKGROUND OF THE INVENTION

1. Field of the Invention

The present invention relates to an image reader which can edit a plurality of images.

2. Description of the Prior Art

An image reader detects an image on a document with an image sensor, binarizes the obtained signal of the detected image with a predetermined processing method such as a bi-level or dither processing so as to transform the signal into binary image signal data, and sends the binarized signal data to an output apparatus such as a printer.

It is desirable to binarize signal data of an image with use of a predetermined threshold level (bi-level processing) if it includes only characters and/or line figures. And, if it includes an image of half-tone therein, it is desirable to binarize signal data with use of a halftone processing such as a dither matrix.

On the binarization of an image wherein characters and a half-tone image coexist at the same time, it is necessary to assign the bi-level and dither processings to each part of the image.

It is also desirable for an image reader to have editorial functions such as masking, trimming and reversal of image between black and white, besides a switching function for switching the bi-level processing to dither processing or vice versa according to the property of image.

In an image processor disclosed in Japanese Patent Laid Open Publication No. 45,765/1984, a signal for designating the bi-level or dither processing is allotted to each small area defined on a document, and it is stored in a zone memory. Then, image data of each small area are stored in either an image memory provided for bi-level processing or another for dither processing according to the designation of individual signal stored in the zone memory. Next, the image data read from both image memories are binarized wih a bi-level processing, if it is designated by said signal, and with a dither-processing, if it is designated, respectively, and the binarized signals are sent to the same image output apparatus.

However, in the image processor of this type, image memories, each having a large capacity for example of a full memory for A3 size, are needed besides the zone memory.

SUMMARY OF THE INVENTION

An essential object of the present invention is to provide an image editor which can process image signals without using any image memory.

In order to accomplish the object, according to the present invention, there is provided an image editor comprising: photo-electric transformation means for transforming an optical image into electric signals at every pixel thereof; attribute memory means for an storing attributes for indicating a processing method of image signal for every unit of a virtual area on an image area of a document, said virtual area being defined each as one of the areas obtained by dividing the image area of a document regularly so as to have a larger area than that of one pixel; attribute designation means for indicating an attribute of each unit of virtual area to said attribute memory means; and image signal processing means for processing an output signal from an individual pixel of said photo-electric transformation means according to attribute data stored in said attribute memory means of a corresponding virtual area in which said pixel is included.

In an image editor according to the present invention, data about attributes of image such as bi-level, dither, reversal or void for unit areas are written into an attribute memory, and image data detected is edited or processed according to the attribute of a unit area to which the image data belongs and is sent directly to an output apparatus successively. No image memory for memorizing individual image data together with an attribute thereof is needed.

BRIEF DESCRIPTION OF THE DRAWINGS

The object and advantage of the invention may be understood with reference to the following detailed description of an illustrative embodiment of the invention, taken together with the accompanying drawings in which:

FIGS. 1 and 2 show examples of dither patterns of $8 \times 8$ and $4 \times 4$, respectively;

FIG. 3 is an example of a diagram of a document which consists of image areas having different attributes;

FIG. 4 shows attribute data written in an attribute RAM according to the document shown in FIG. 3;

FIG. 5 is a schematic sectional view of an image reader portion of an image editor according to the present invention;

DESCRIPTION OF PREFERRED EMBODIMENTS

Figure 6:
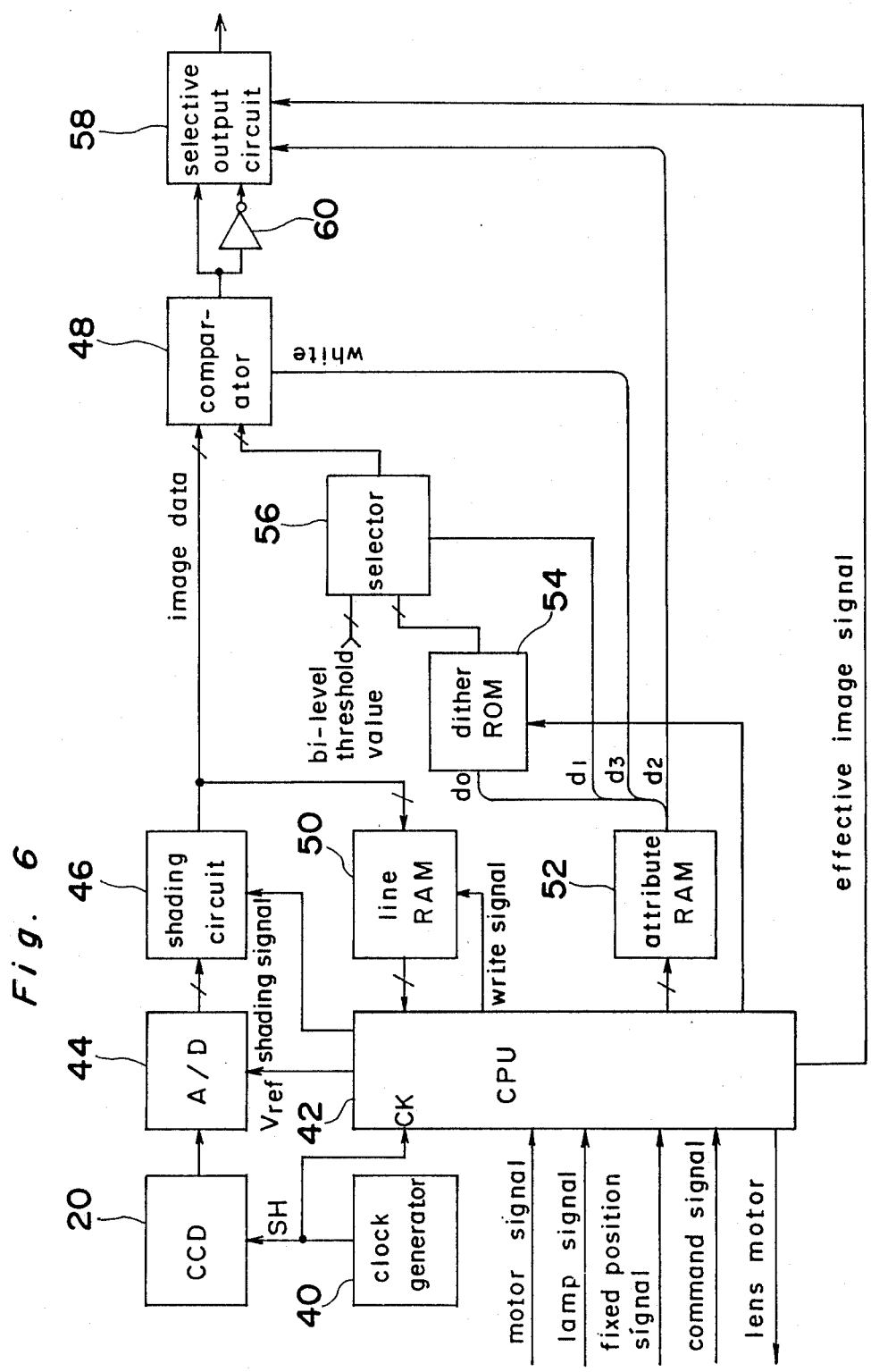
FIG. 6 is a block diagram of an electric circuit of the image editor.

Referring to the drawings, a preferred embodiment of the present invention will be explained in a following order:

a. Composition of attribute RAM
b. Mechanism of image editor
c. Control circuit of image editor
d. Flow for image processing (a) Composition of attribute RAM In a preferred embodiment of the present invention, an image area assigned for reading an image of a document is divided virtually into small rectangulars of, for example, 1 mm × 1 mm when seen on an image plane of a display, each attribute such as bi-level, half-tone or the like assigned to each area is written in a memory called an attribute random-access memory (RAM) which has a capacity enough to store all of attributes given to every area. Then, the resolution of the reading of an image is set to for example, twelve lines per 1 mm in the embodiment, and a pixel has a size of 1/12 mm × 1/12 mm. The image of a document is edited according to the attributes stored in the attribute RAM.

Every attribute data written in the attribute RAM is composed of four bits ($D_0$, $d_1$, $d_2$, $d_3$), and each bit designates an attribute information as shown in Table 1. That is, the first bit $d_0$ designates either of dither patterns for dither processing as shown in FIGS. 1 and 2. A dither pattern, shown in FIG. 1, of an $8 \times 8$ matrix for sixty four gradations is more suitable for the representation of gradation but it has a lower resolution, while another dither pattern, shown in FIG. 2, of a $4 \times 4$ matrix for sixteen gradations can increase the resolution of reading to some extent but it is inferior in the representation of gradation to the former. The second bit $d_1$ designates either of the bi-level processing or dither processing as a method for the image processing. The third bit $d_2$ designates the reversal of black and white. The fourth bit $d_3$ designates void or blank.

TABLE 1

| | attribute information |
|---|---|
| $d_3$ | white/effective pixel |
| $d_2$ | reversal/non-reversal |
| $d_1$ | bi-level/dither |
| $d_0$ | dither pattern 1/dither pattern 2 |

Eight effective attribute data, as shown in Table 2, can be obtained among all of combinations of four-bit attribute information shown in Table 1.

TABLE 2

| | attribute data |
|---|---|
| 00XX | white |
| 01XX | black |
| 100X | bi-level |
| 1010 | dither pattern 1 |
| 1011 | dither pattern 2 |
| 110X | reversal, bi-level |
| 1110 | reversal, dither pattern 1 |
| 1111 | reversal, dither pattern 2 |

Editing such as masking, trimming, reversal between white and black or switching between bi-level and dither processings can be performed by using the attribute RAM mentioned above. An example of editing is explained by using FIGS. 3 and 4. Now, let's assume that a document includes four part A-D as shown in FIG. 3 and that the four parts A-D of the document is to be edited as follows:

| part A | dither processing with |
| (half-tone-image) | a dither pattern 1 (1010) |
| part B | reversal of characters (110X) |
| part C | void (00XX) |
| part D (characters) | bi-level processing(100X) |

Areas of the parts A, B and C are designated by an operator together with desirable attribute data of parts A,B,C and D.

According to these data, attribute data are written into the attribute RAM in a unit of the rectangular mentioned above. The content of the attribute RAM is shown in FIG. 4.

As will be explained later, image data of the document is processed according to the data stored in the attribute RAM. For example, each rectangular area in part A (photograph) is edited with the use of the half-tone processing while that in part D (characters) is edited with use of the bi-level processing. The edited image is sent to an output apparatus per each clock for an image signal.

(b) Mechanism of image editor

FIG. 5 shows a schematical sectional view of an image reader. A light source 2 for exposure illuminates a document 6 placed on a glass platen 4 along a document scale (not shown). The light source 2 for exposure consists of a halogen lamp, a concave mirror 8 and an infrared filter 10.

The light reflected from the document 6 is reflected successively in a scan system or a slider which comprises a first mirror 12, a second mirror 14 and a third mirror 16. Then, it is projected on a one-dimensional charge-coupled device (image sensor) 20 through an optical focusing lens assembly 18.

The charge coupled device (hereinafter referred to as CCD) 20is held by a CCD holder 22, which supports it so as to allow adjustments with respect to the position and the angle thereof. The CCD holder 22 and the lens assembly 18 are mounted on a carriage 24.

The reading magnification of an image of the document 6 can be varied continuously by moving the carriage 24 along the direction of the optic axis 26 of the lens assembly 18 by using a motor (not shown).

The focus condition can be adjusted by moving the CCD 20 along the direction of the optic axis 26 of the lens assembly 18 with the use of a motor (not shown) mounted on the carriage 24.

As is well known to those skilled in the art, on scanning the document 6, the light source 2 and the first mirror 12 are moved integrally in a direction indicated by an arrow S at a velocity V, while the second and third mirrors 14, 16 are moved integrally in the direction of the arrow S at the velocity of $(\frac{1}{2})$V, in order to keep the length of the optical path from the document 6 to the CCD 20 constant.

(c) Control circuit of image editor

FIG. 6 shows a block diagram of a control circuit for processing image data detected by the CCD 20. A clock generator 40 gives clock signals to a microprocessor (CPU) 42 and sample-hold (SH) signals to the image sensor 20. The CCd 20 consists of, for example, 2048 picture elements. They are aligned in a line parallel to the direction of a main scan so that one line of an image of a document can be received thereby and that charges corresponding to the light density of the line can be integrated therein at the same time during a period determined by a SH signal. In the next period, the charges each integrated in each element of the CCD 20 are transferred to registers in parallel and they are read out successively (this process is called a main scan). An analog-to-digital (A/D) converter 44 transforms each analog output signal sent by the image sensor 20 into a digital signal. A shading circuit 46 is provided for correcting possible changes in the intensity of light along the direction of the main scan as well as possible differences among characteristics of the elements of the image sensor 20, and the timing of the correction is given by CPU 42. The output signal of the shading circuit 46 is sent to both a comparator 48 and a line RAM 50. The data thus obtained by scanning and correcting for the shading thereof are stored in the line RAM 50 according to WRITE signals given by CPU 42. At the same time, the scan system is moved by one line in the direction perpendicular to that of the main scan (this process is called a subscan) in order to obtain image date with respect to the next one line. CPU 42 obtains image data of each one line by accessing the line RAM 50. This procedure is repeated successively from the top to the bottom of the area of the platen 6.

CPU 42 controls the image editor according to motor signal, lamp signal, standard position signal and command signal, and other signals such as mentioned above.

The attribute RAM 52 stores attribute data as designated by CPU 42 according to command signals relating to attributes given by an operator through an operational panel (not shown). A dither ROM 54 generates a threshold value in the form of a matrix of either the first dither pattern 1 (FIG. 1) or the second dither pattern 2

(FIG. 2) according to attribute information $d_0$ when dither-processing is selected ($d_1=1$). A selector 56 selects either a threshold value sent from the dither ROM 54 or a predetermined bi-level threshold value for bi-level processing according to an attribute information $d_1$ of bi-level/dither, and sends the threshold value to a comparator 48. That is, when the attribute of an area under processing is designated to the dither, the selector 56 sends dither data received from the dither ROM 54 to the comparator 48, whereas when the attribute is designated to the bi-level, the selector 56 sends the bi-level threshold value to the comparator 48. The bi-level threshold value is provided by a known circuit. The comparator 48 compares an image data received from the shading circuit 46 with the threshold value sent from the selector 56, and sends a resultant one-bit data and an inverted data by an inverter 60 to a selective output circuit 58. When the attribute information $d_3$ is '1', the comparator 48 sends white data. The selective output circuit 58 sends either said resultant one-bit data or the inverted data thereof to a printer (not shown) according to the attribute information $d_2$ in a manner synchronized with the effective image signal sent from CPU 42.

(d) Flow for image-processing

Figure 7A:
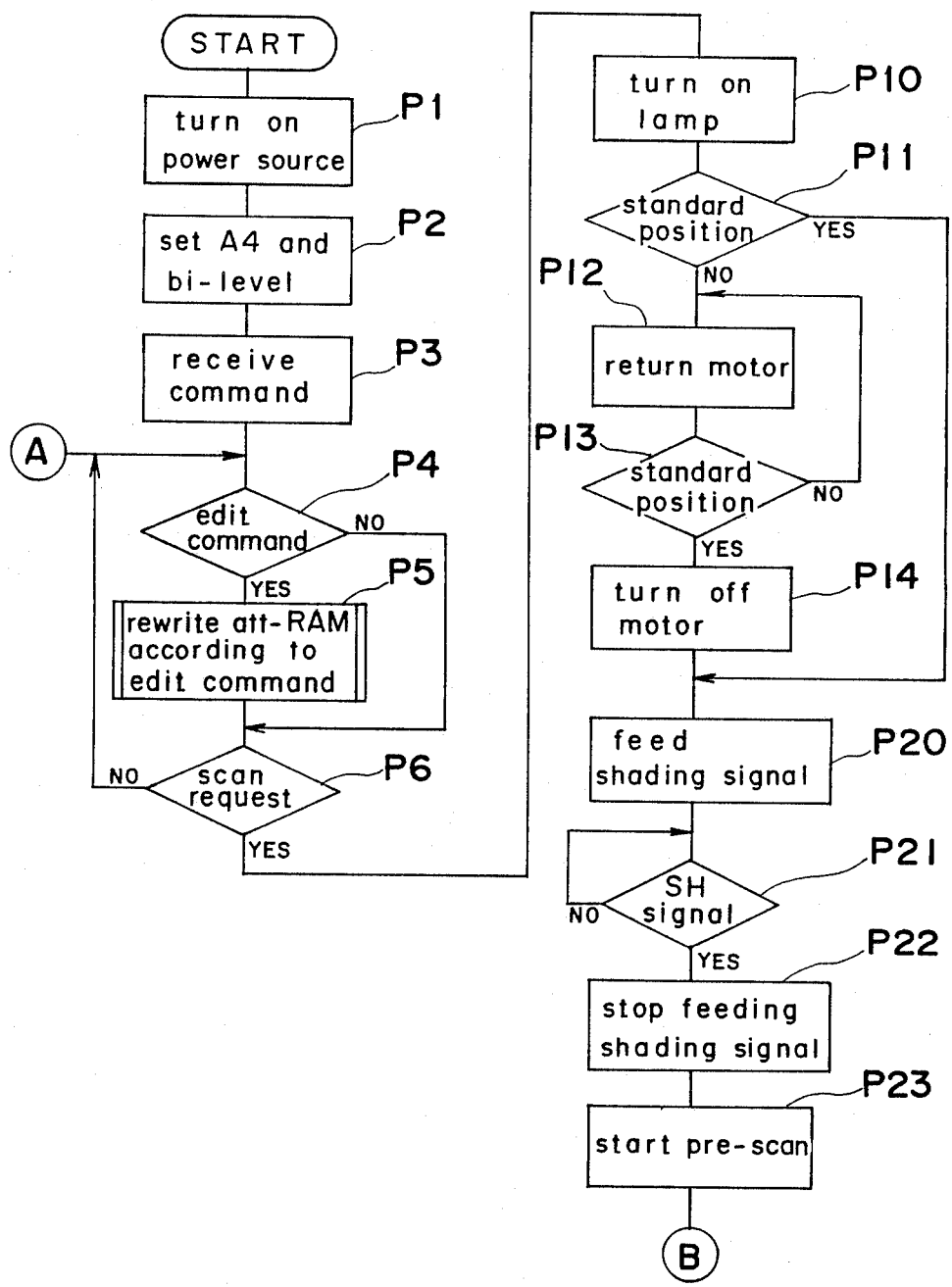
FIGS. 7($a$) and ($b$) are flowcharts for an image processing according to the present invention.
Figure 7B:
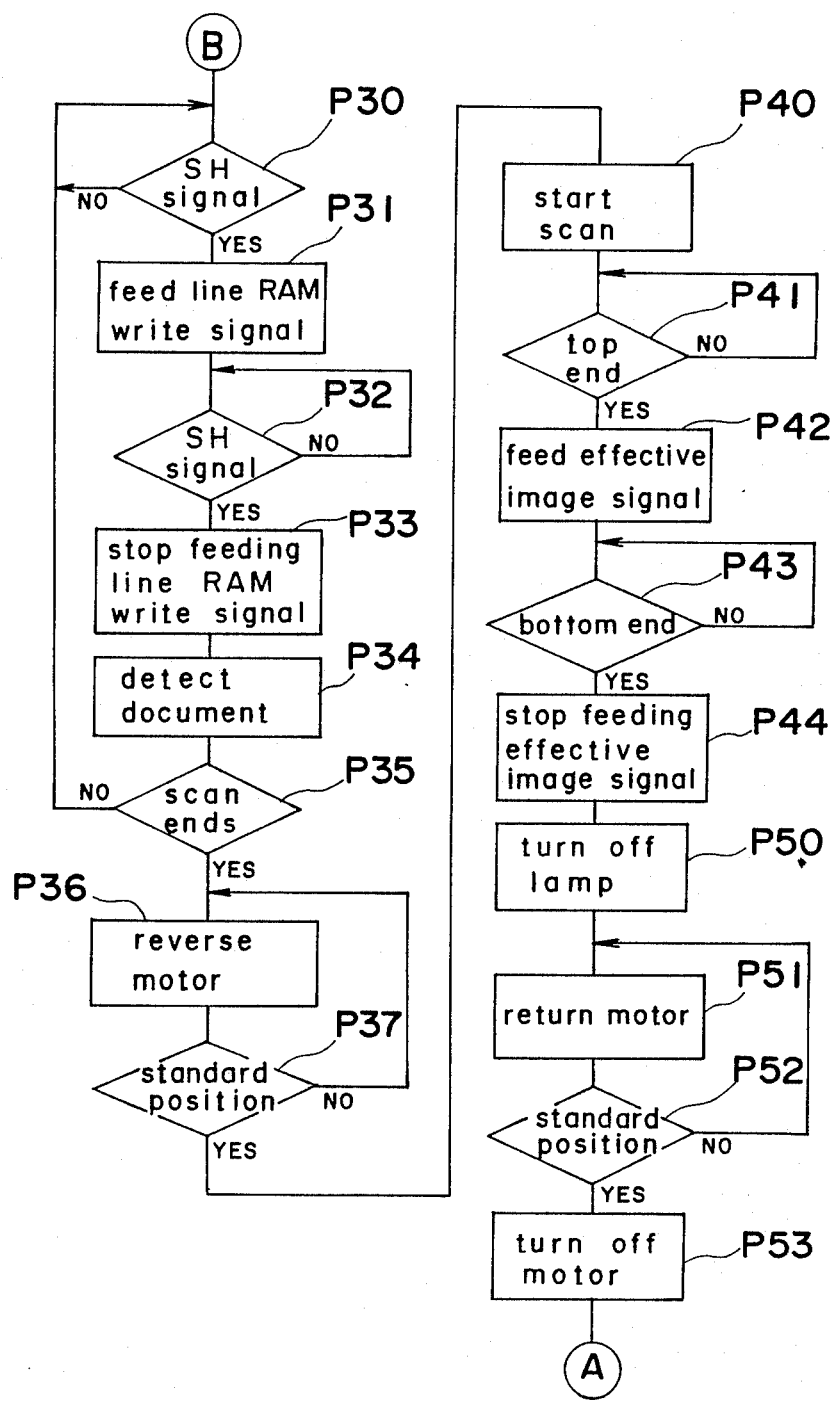

FIGS. 7(a) and 7(b) show a flowchart of an image-processing program to be performed by CPU 42 of the image editor according to the present invention.

When the electronic power source of the image editor is turned on (step P1), the initialization is done first. Parameters such as magnifying power of the scan system are set as predetermined default values. As to the attribute RAM 52, "A4-lateral" size is set for indicating a size of a document and a direction thereof, and the bi-level ('100x') as the attribute information are set as default values (step P2). At the next step P3, the program waits one or more command signals, which includes commands for an operator to alter the default values. Then, it is decided whether the command is an edit command or not (step P4). If it is decided "YES", attribute data designated by said command signal or signals are written into the attribute RAM 52 together with position data about designated area (for example, parts A-C in FIG. 3) (step P5). If the decision for "NO" at step P4, the program goes to step P6.

Then, it is decided at step P6 whether the command is a start command (scan request) or not. If the decision is "NO", the program returns to step P4. If the start command is received (step P6), a following scan operation is started according to the magnifying power and other parameters of the scan system having been set prior to the start thereof.

Then, the exposure lamp 2 is turned on at step P10. Next, it is decided whether the scan system (slider) has returned to a predetermined standard position for starting the scan operation or not (step P11). If the decision is "NO", the scan motor is driven so that the scan system is moved in the return direction to the standard position (step P12) until the scan system locates at the standard position (step P13). As soon as the scan system has returned thereto, the scan motor is turned off (step P14).

Next, the shading process is started when a shading signal is applied to the shading circuit 46 at step P20. After a sample-hold (SH) signal has a synchronizing signal with the output of the image sensor 20 is sent (step P21), the shading signal is stopped to be fed (step P22), and a pre-scan for detecting the location of a document is started (step P23).

Referring now to FIG. 7(b), when the next SH signal is received (step P30), image data sent by the image sensor 20 and corrected by the shading circuit 46 are written into the line RAM 50 (step P31). Next, when a further SH signal is received (step P32), the "WRITE" signal to the line RAM 50 is stopped (step P33). Then, the position of a document is detected from the data written in the line RAM 50 (Step P34). Next, it is decided whether the pre-scan has been completed or not (step P35). If the decision is "YES", the motor is switched so as to move the scan system in the return direction (step P36) till the slider returns to the standard position (step P37).

When it has returned thereto, a normal scan for reading a document is started. First the scan motor is driven in the direction of sub-scan by a predetermined step, and a scan for the output of the data is started (step P40).

A margin at a top side of a copy paper is calculated from the size of the document, the size of the copy paper chosen and the magnifying factor designated so that the image of the document is copied within the copy paper. The calculated value of the margin or the position of the top end of the image on the document is used for the generation of the subscan synchronizing signal for the feed of a paper in the printer. The subscan synchronizing signal is sent after a delay time calculated according to the margin from the start of the scan (step P40). Next, the scan of the scan motor is continued till the top position of the image which has been determined at the pre-scan is detected (step P41). Then, the output circuit 54 is made effective (step P42). After this, the read-out of the image proceeds successively till it is decided that the scan comes to the position of the bottom end of the image area in the document (step P43). Then, the output of the output circuit 54 is stopped (step P44), and the exposure lamp 2 is turned off (step P50). The scan system is returned (step P51) until the slider reaches the standard position (step P52). Then, the motor is also turned off (step P53). After this, the program returns to step P4, and the next start command is waited.

The preferred embodiments described herein are illustrative and not restrictive, the scope of the invention being indicated by the appended claims and all variations which come within the meanings of the claims are intended to be embranced herein.

What is claimed is:

1. An image editor for editing and processing image data according to attributes designated thereabout comprising:

photo-electric transformation means for transforming an optical image into electric signals for individual pixels thereof;

attribute memory means for storing attributes for indicating a processing method of an image signal for every unit of virtual area on an image area of a document, said virtual area being defined for each unit as one of the areas obtained by dividing the image area of a document regularly so as to have a larger area than that of one pixel;

attribute designation means for indicating an attribute of each unit of virtual area to said attribute memory means;

image signal processing means for processing an output signal from an individual pixel of said photoelectric transformation means according to attribute data stored in said attribute memory means of a corresponding unit of virtual area in which said pixel is included.

2. An image editor according to claim 1, wherein said photoelectric transformation means has analogue to digital conversion means for converting electric signals received thereby to digital signals, comparator means for comparing each digital signal with a predetermined threshold values and means for selecting the threshold value to be sent to the comparator means from a threshold value set for a bi-level processing and for a half-tone processing according to the attribute data stored in the attribute memory means.

3. An image editor according to claim 1, wherein an attribute for indicating to make a designated area white is included among attributes and when said attribute is designated, said image processing means send signals of a constant level regardless of image data detected by the photo-electric transformation means.

4. An image editor according to claim 1, wherein an attribute for indicating the reversal of image data is included among attributes and when said attribute is designated, said image processing means sends signals being reversed from black to white or vice versa.

5. An image editor for editing and processing image data according to attributes designated thereabout comprising:
photo-electric transformation means for transforming an optical image into electric signals for every one of the pixels thereof;
attribute memory means for storing an individual attribute for indicating a processing method of an image signal for every unit of virtual area on an image area of a document, said virtual area being defined for each unit as one of the areas obtained by dividing the image area of a document regularly so as to have a larger area than that of one pixel;
attribute designation means for indicating an attribute of each unit of virtual area to said attribute memory means;
image signal processing means for processing an output signal from an individual pixel of said photoelectric transformation means according to attribute data stored, corresponding in said atribute memory means, to a virtual area in which said pixel is to be included; and
means for setting an attribute bi-level for all units of virtual unit areas in the attribute memory means when the electric power for the image editor is turned on.

6. An image editor according to claim 5, wherein said photoelectric transformation means has an analogue-to-digital conversion means for converting electric signals received thereby to digital signals, comparator means for comparing each digital signal with a predetermined threshold value and means for selecting the threshold value to be sent to the comparator means from a threshold value set for a bi-level processing and for a half-tone processing according to the attribute data stored in the attribute memory means.

* * * * *